(12) United States Patent
DuckWorth et al.

(10) Patent No.: US 12,291,465 B2
(45) Date of Patent: **\*May 6, 2025**

(54) WATER TREATMENT FOR REMOVING PFAS

(71) Applicant: The Water & Carbon Group Pty, Ltd., Brisbane (AU)

(72) Inventors: Cliff Alexander DuckWorth, Brisbane (AU); James Patrick Hunter, Brisbane (AU)

(73) Assignee: The Water & Carbon Group Pty, Ltd., Brisbane (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,272

(22) Filed: Sep. 1, 2023

(65) Prior Publication Data

US 2023/0406726 A1  Dec. 21, 2023

Related U.S. Application Data

(63) Continuation of application No. 17/043,668, filed as application No. PCT/AU2020/050938 on Sep. 5, 2020, now Pat. No. 11,780,746.

(30) Foreign Application Priority Data

Sep. 6, 2019 (AU) .................................. 2019903302

(51) Int. Cl.
  *C02F 1/24* (2023.01)
  *C02F 3/08* (2023.01)
  (Continued)

(52) U.S. Cl.
  CPC .................. *C02F 1/24* (2013.01); *C02F 3/08* (2013.01); *C02F 9/00* (2013.01);
  (Continued)

(58) Field of Classification Search
  None
  See application file for complete search history.

(56) References Cited

U.S. PATENT DOCUMENTS 4,853,088 A  8/1989  Conway
7,485,232 B2  2/2009  Yamasaki et al.
(Continued)

FOREIGN PATENT DOCUMENTS

WO  2017131972 A1  8/2017
WO  2017210752 A1  12/2017
(Continued)

OTHER PUBLICATIONS

International-Type Search Report for AU Provisional Patent Application No. 2019903302 Mailed on Aug. 17, 2020, 20 Pages.

*Primary Examiner* — Chester T Barry
(74) *Attorney, Agent, or Firm* — EcoTech Law Group, P.C.

(57) ABSTRACT

An above-ground low-energy method of dewatering highly contaminated waste e.g. leachate contaminated with at least a first group of contaminants and PFAS is described. The method comprises the step of removing the PFAS before removing the first group of contaminants. The removal of PFAS is undertaken by actively aerating the contaminated waste comprising PFAS to produce a waste stream comprising a concentration of PFAS and a liquid stream having at least some of the first group of contaminants. The one or more liquid streams are separated from the waste streams so as to dewater the contaminated waste. Optionally, the liquid streams are treated to remove the first group of contaminants.

11 Claims, 5 Drawing Sheets

(51) Int. Cl.
C02F 9/00 (2023.01)
*C02F 101/36* (2006.01)
*C02F 101/38* (2006.01)
*C02F 103/00* (2006.01)
*C02F 103/06* (2006.01)

(52) U.S. Cl.
CPC .... *C02F 2101/363* (2013.01); *C02F 2101/38* (2013.01); *C02F 2101/40* (2013.01); *C02F 2103/002* (2013.01); *C02F 2103/007* (2013.01); *C02F 2103/06* (2013.01)

(56) References Cited

U.S. PATENT DOCUMENTS

| 7,641,798 | B2 | 1/2010 | Yamasaki et al. |
| 9,694,401 | B2 | 7/2017 | Kerfoot |
| 10,259,730 | B2 | 4/2019 | Ball et al. |
| 10,519,052 | B2 | 12/2019 | Ball et al. |
| 11,780,746 | B2 * | 10/2023 | DuckWorth ............. B03D 1/02 210/703 |
| 2017/0348743 | A1 | 12/2017 | Kerfoot |
| 2019/0176101 | A1 | 6/2019 | Phillips et al. |
| 2019/0263679 | A1 | 8/2019 | Phillips et al. |
| 2019/0300387 | A1 | 10/2019 | Nelson |
| 2020/0148565 | A1 | 5/2020 | Ball et al. |
| 2021/0300789 | A1 | 9/2021 | Phillips |
| 2022/0185701 | A1 | 6/2022 | DuckWorth |

FOREIGN PATENT DOCUMENTS

| WO | 2017218335 A1 | 12/2017 |
| WO | 2019051208 A1 | 3/2019 |
| WO | 2019111238 A1 | 6/2019 |
| WO | 2020097694 A1 | 5/2020 |

* cited by examiner

Figure 4

Bench Scale

| Analyte | Unit | Min | Max | Average |
|---------|------|------|------|---------|
| PFOS | ug/L | 0.4990 | 0.6490 | 0.574 |
| PFHxS | ug/L | 0.553 | 0.859 | 0.708 |
| PFOA | ug/L | 1.48 | 1.53 | 1.505 |

Site

| Analyte | Unit | Min | Max | Average |
|---------|------|------|------|---------|
| PFOS | ug/L | 0.1500 | 2.7500 | 0.83 |
| PFHxS | ug/L | 0.37 | 2.75 | 0.77 |
| PFOA | ug/L | 0.45 | 7.30 | 1.92 |

Figure 5

| Analyte | Unit | Raw | Treated Liquid 1 | Treated Liquid 2 | Treated Liquid 3 | Treated Liquid 4 |
|---------|------|-----|------------------|------------------|------------------|------------------|
| PFOS | ug/L | 0.34 | <0.100 | <0.100 | <0.100 | <0.100 |
| PFOA | ug/L | 1.17 | 0.4 | 0.25 | 0.12 | <0.100 |

WATER TREATMENT FOR REMOVING PFAS

RELATED APPLICATION

This application is a continuation application of U.S. Pat. No. 11,780,746 issued on Oct. 10, 2023, which in turn claims the benefit from International Application No. PCT/AU2020/050938, which was granted an International filing date of Sep. 5, 2020, which in turn claims priority from Australian Provisional Application having Serial No. 201903302 filed on Sep. 6, 2019, all of which are incorporated herein by reference for all purpose.

TECHNICAL FIELD

The present invention relates to the treatment of wastewater polluted with high levels of different contaminants. In embodiments, the wastewater is one or more of sewage, leachate, industrial, or even contaminated captured surface water. One of the contaminants alongside the other contaminants in the polluted wastewater is per- and polyfluoroalkyl substances (PFAS).

BACKGROUND

Water can become polluted from a variety of sources including human activities. Once water is polluted, if captured, it may need to be treated before it can be introduced back into the environment. Leachate is a type of polluted water that is particularly difficult to treat due to the high-levels of different contaminants. Leachate is water that runs off from e.g. landfill and it can be contaminated by the materials in the landfill. Leachate can be harmful to the health of the surrounding flora and fauna. The Total Organic Carbon (TOC) content of the leachate can be in the range of from about 200 to 25,000 mg/L. This is high compared to e.g. groundwater which usually has TOC levels in the range of from about 1 to 5 mg/L. The leachate may also have, for example, high levels of Total Dissolved Solids (TDS), heavy metals, nutrients (including Total Nitrogen (TN) which includes Total Kjeldahl Nitrogen (TKN) which can include ammonia) and sometimes oils and grease. Depending on the source of the leachate, it can also be contaminated with per- and polyfluoroalkyl substances (PFAS) which exists alongside the other contaminants as a co-contaminant.

PFAS are a group of man-made chemicals that are very persistent in the environment and in the human body. There is ongoing research into PFAS exposure and deleterious human health effects. Specific PFAS chemicals that have in the past been incorporated into fire-fighting foams have been used on fires at many thousands of emergency and training sites (e.g. airports, air force bases and other military sites, and metro and country fire service training sites). PFAS is also present in many products that find their way to landfill.

The treatment of wastewater, such as leachate, contaminated with PFAS is a challenge because of the existence of the other contaminants. The presence of the co-contamination means that traditional treatment methods cannot be viably applied. Leachate is fouling by nature. If the leachate is subject to filter media, it would quickly be blinded by the high-levels of e.g. TOC and TDS. If other treatment media are provided, such as drying drums, the equipment would quickly be fouled by the high levels of e.g. TOC and TDS and it would be necessary to clean the equipment after use in order to maintain the heat transfer coefficients. This stop for maintenance would be costly in terms of both time and money.

Typically, the treatment of water contaminated with high levels of TOC, TDS, TN e.g. municipal wastewater and leachate result in a clean water stream and a waste such as sludge, and or biosolids. The sludge must be disposed of and there are various ways in which it can be remediated. However, if clean water is separated from the leachate, but the PFAS is not properly removed, it can remain as a hazard in the waste sludge. A PFAS contaminated waste sludge is expensive to dispose of There are laws and regulations in most countries that govern how PFAS contamination should be handled and treated.

Accordingly, there exists a need for a wastewater treatment process for water polluted with high levels of co-contaminants, at least one of which is PFAS. In embodiments, the wastewater is a leachate comprising high levels of co-contamination including PFAS. Preferably, the treatment method is not energy intensive, does not produce large volumes of by-products e.g. brine and is commercially viable, so that large amounts of wastewater can be treated.

SUMMARY OF INVENTION

Herein described is an above ground low energy method of dewatering waste contaminated with at least a first group of contaminants and PFAS, the method comprising the steps of:
(a) removing the PFAS before removing the first group of contaminants;
(b) removing the first group of contaminants;
in step (a) the removal of PFAS is undertaken by:
actively aerating the contaminated waste comprising PFAS in a first vessel to produce a waste stream comprising a concentration of PFAS and a first liquid stream having at least some of the first group of contaminants;
subjecting the waste stream to a second process comprising actively aerating the waste stream in a second vessel to further concentrate the PFAS in a second waste stream, and also to generate a second liquid stream having at least some of the first group of contaminants; subjecting the second waste stream to a further process to further concentrate the PFAS in the waste stream, and also to generate a third liquid stream having at least some of the first group of contaminants;
wherein one or more of the first, second and third liquid streams having at least some of the first group of contaminants are separated from the waste streams so as to dewater the contaminated waste; and
in step (b) the removal of at least some of the first group of contaminants is undertaken by treating the first, second and or third liquid streams either separately or together.

In an alternative aspect, there is provided an above-ground low-energy method of generating a highly PFAS concentrated waste stream, comprising:
actively aerating waste, contaminated with a first group of contaminants and PFAS, in a first vessel to produce a waste stream having a first PFAS concentration, and a first liquid stream having at least some of the first group of contaminants;
actively aerating the waste stream having a first PFAS concentration in a second vessel to produce a second waste stream having a second PFAS concentration, and a second liquid stream having at least some of the first group of contaminants;

passing the second waste stream having a second PFAS concentration through a further process to produce a third waste stream having a third PFAS concentration, and a third liquid stream having at least some of the first group of contaminants;

wherein the third PFAS concentration is higher than the second PFAS concentration;

further wherein, at least one of the first, second and third liquid streams having the first group of contaminants are treated so as to remove at least some of the first group of contaminants.

In one form there is provided an above-ground low-energy method of generating a highly PFAS concentrated waste stream from a waste, the waste comprising at least one of sewage, leachate, contaminated surface water, municipal wastewater and industrial wastewater, the waste contaminated with a first group of contaminants and having a TOC level greater than about 5 mg/L and the waste contaminated with PFAS, the PFAS including perfluorooctanoic acid (PFOA) and perfluorooctanesulfonic acid (conjugate base perfluorooctanesulfonate) (PFOS), the method including the steps of:

actively aerating the waste in a first vessel to produce a waste stream having a first PFAS concentration, and a first stream having at least some of the first group of contaminants;

actively aerating the waste stream having a first PFAS concentration in a second vessel to produce a second waste stream having a second PFAS concentration, and a second stream having at least some of the first group of contaminants;

passing the second waste stream having a second PFAS concentration through a further process to produce a third waste stream having a third PFAS concentration, and a third stream having at least some of the first group of contaminants;

wherein the third PFAS concentration is higher than the second PFAS concentration;

further wherein, at least one of the first, second and third streams having the first group of contaminants are treatable so as to remove at least some of the first group of contaminants.

The invention also includes waste when treated by a process according to the invention. The invention also includes an apparatus and system adapted to perform the invention.

In an embodiment, the method includes the step of treating the streams with the first group of contaminants so as to remove some of the contaminants. In an embodiment, the method does not include this step and instead it is performed by a different party.

In the description below, the embodiments described in relation to one aspect of the invention apply equally to the other aspects of the invention unless the context makes clear otherwise.

In an embodiment, the first stream having at least some of the first group of contaminants and or the second water stream having at least some of the first group of contaminants are treated prior to mixing with other water streams having at least some of the first group of contaminants. This can be to ensure that the maximum amount of PFAS possible has been removed. The treatment can be further active aeration of the already aerated streams having at least some of the first group of contaminants together or separately in a third vessel. There can be other stages of further active aeration as required.

The methods are performed on wastewater. By wastewater it is meant any contaminated liquid comprising waste contaminants including PFAS. The invention does not cover contaminated below-ground water. The present invention is not applicable to contaminated aquifers since the contamination in ground water including TOC levels typically of about < 1 mg/L is not readily transferrable (in a commercially viable way, as more conventional methods of treatment are available) to above ground vessels.

In an embodiment, the waste treated is highly contaminated by more than one contaminant. By more than one contaminant it is meant that there are chemically distinct contaminants that typically require different treatment methods to reduce their concentration (sometimes referred to as co-contaminates). By "highly contaminated" when referred to herein it is meant that the contamination is above that typically found in groundwater and instead is from a pollution episode that has been identified and requires remediation or is from a wastewater type that always has a high level of co-contamination e.g. leachate, sewerage and or municipal wastewater. The highly contaminated waste can be leachate. The contamination can be by a first group of contaminants and a second group of contaminants.

The first group of contaminants are grouped simply by the fact they are not PFAS. The first group of contaminants can be by one or more of (but not limited to): materials that contribute to TOC, materials that contribute to TDS, oil(s), heavy metal(s), ammonia. The level of TOC can be at least about 3500, 4000, 5000, 6000, 7000, 8000 or 9000 mg/L. The level of TDS can be at least about 2,000 mg/L, 8000 mg/L or 14,000 mg/L. The level of TKN can be at least about 400, 800, 1600, or 2500 mg/L although in many instances it can be higher. These contaminants can be removed in step (b) using remediation techniques that would be familiar to the person skilled in the treatment of wastewater having high levels of co-contamination. These treatments are discussed further herein. For example, ammonia may be removed through biological treatment.

In embodiments, the wastewater treated by the method is wastewater that has TOC contamination levels higher than about 4, 5 or 6 mg/L. In an embodiment, the wastewater has TOC contamination higher than about 5 mg/L.

The second group of contaminants comprises the total PFAS concentration. Per- and polyfluoroalkyl substances (PFAS) are a group of man-made chemicals that includes perfluorooctanoic acid (PFOA), perfluorooctanesulfonic acid (conjugate base perfluorooctanesulfonate) (PFOS), Perfluorohexanesulfonate (PFHxS), GenX, and many other chemicals. There are thousands of PFAS compounds, most likely about 3000+. Some PFAS compounds are regulated, and in embodiments these are those that are intended to be subject to the methods of invention since the wastewater should be treated to meet regulations. Regulations change over time, so the invention is presently preferably limited to PFOA and PFOS which are regulated PFAS at the filing date. These are the most studied PFAS chemicals and have been voluntarily phased out by industry, though they are still persistent in the environment. GenX is a trade name for a technology that is used to make high performance fluoropolymers (e.g., some nonstick coatings) without the use of perfluorooctanoic acid (PFOA). Hexafluoropropylene oxide-dimer acid (HFPO-DA) and its ammonium salt are the major chemicals associated with the GenX technology. The focus of the present process is on the removal of PFAS upfront to reduce the likelihood of the regulated compounds requiring treatment in resultant waste e.g. sludge and to do so cost effectively in the presence of a range of co-contaminants.

Sum PFAS is the calculated PFAS concentration based on the constituents analysed. Of these PFOS and PFOA can be the target compounds as they are deemed higher risk and have been the focus of guideline values (regulations). However, of the 3000+ compounds available labs typically can analyse for a select few. In one example, the lab can analyse for n=12/28/35 compounds. Some of the compounds are pre-cursors to others, meaning they may breakdown to the regulated compounds. A regulator may require the other PFAS to be treated to be removed as well, even though there is currently no published guidance. In some embodiments, the method reduced the sum PFAS. The sum PFAS can be the n12, 28 or 35 compounds. In all embodiments, the concentration of at least one PFAS is compound is reduced to a lower concentration by the method.

Each stage of active aeration produces a foamate and a body of water on which the foamate floats. The body of water (which are sometimes referred to as a stream or a liquid stream) can be the first, second and or third streams respectively having the first group of contaminants as described. Upon removal of the foamate by e.g. skimming or other collection method, the waste stream with the first contaminants would be the water left in the vessel. The water left in the vessel can be subject to further active aeration alongside the foamate as described above. The water in the vessel can be treated in the same vessel. The water in the vessel can be removed from the vessel via e.g. tubing for treatment in a separate facility.

In the first active aeration step, at least some (preferably all) of the PFAS contamination will be removed. When considering how much PFAS has been removed, typically, the focus is on the regulated PFAS components including PFOS and PFOA. It is thought that at least about 100, 99, 90, 80, 70, 60 or 50% of the total regulated PFAS concentration will be removed by the first active aeration step and accumulates in the waste stream. The active aeration will also inevitably remove at least some of the first group of contaminants. For example, at least some of the TOC, TDS, TKN, oil, heavy metal and or ammonia may accumulate at the air/water bubble interface and be floated to the surface with the PFAS. However, the active aeration is not intended to or tailored for the removal of the first group of contaminants. While the regulated PFAS is removable with the waste streams, it is likely that only some of the first group of contaminants will be removed in the waste streams. An additional amount of first group contamination may be removed by the second active aeration. The first, second and third waste streams having the remaining first group contamination can comprise at least about 80, 70, 60 or 50% of the initial total amount of the first group contamination. This means that the first group contamination may have been inadvertently (but advantageously) reduced by about 20, 30 or 40% of its starting concentration. In an embodiment, it was found that about 50% of the TKN in leachate was removed during PFAS removal. When a percentage of TKN is removed it should be understood that it is the percentage of the TKN of the total nitrogen (TN) component that is removed. Surprisingly, in liquid sourced from one landfill, a reduction of nearly 50% in TKN was identified in the feed liquid concentrated to the foam in conjunction with PFAS removal. From 950 mg/L to 410 mg/L, 457 mg/L and 453 mg/L across three separate tests.

The removal of the first group of contaminants can be by one or more of the following processes:

Sequential Batch Reactor (SBR)

Sequential batch reactors (SBR) are the most commonly used form of nitrogen treatment around the world (particularly for leachate) and is a mature conventional process for removing nutrients form wastewater. This configuration has a higher level of flexibility and control, allowing more rapid adjustment to changing influent characteristic. The SBR process can be conducted in two independent batch reactors following a sequence of fill, reaction, settling and decanting phases. The fill phase for this design can be aerated, for treatment objectives which in this design is for conversion of all Ammonia to Nitrates (required prior to denitrification). In the aerated fill phase, biological respiration will hold ammonia and free nitrous acid concentrations at low levels, which is of importance for good reaction efficiency and process control. In the (Aerobic) react phase, organic matter is oxidised, and nitrification reactions take place. Once monitored levels of ammonia drop to the required levels or after the calculated required retention time, there is a period of settling, before the draw/decanting phase which will decant the aerobically treated leachate into a balance tank which feeds a constant flow to the MBBR process tank.

Moving Bed Bioreactor

The anoxic MBBR is an attached-growth biological treatment system, based on the use of suspended carrier mechanisms which increases the amount of biofilm available to treat the stream (e.g. leachate having PFAS removed) and brings the denitrifying bacteria into contact with more of the material to be treated in a smaller tank volume. The plastic carriers can be kept suspended in the aeration tanks by mechanical mixing. The plastic media can be retained in the system by a sieve at the outlet of the tank. Like the complementary SBR system the anoxic MBBR system does not require any return sludge recirculation and the required reactor size is significantly smaller than conventional activated sludge etc.

The effluent from the balance tank can be pumped to the anoxic MBBR tank where denitrification will occur. Denitrification is a term applied to a biological wastewater treatment process used to convert NO3-N into nitrogen gas (N2) using a carbon source. Due to the low BOD content in the leachate, an external carbon source can be added to enable denitrification. Therefore, carbon (Molasses) can be dosed to the anoxic tanks and controlled.

DAF Dissolved Air Flotation

The effluent from the MBBR anoxic tank can flow via gravity at a constant rate to a Dissolved Air Flotation (DAF) system for separation of biomass produced during the biological treatment within the MBBR. Excess biomass produced in the MBBR collected in the DAF can be collected, thickened, and dewatered using a screw press. The quality of the biosolids removed can be analysed to determine suitability for reuse, such as an agricultural soil ameliorant. If the analysis does not meet regulatory standards, then the waste will be disposed to landfill. The water separated by the dewatering press (filtrate) will be collected and redirected to the SBR for re-treatment. The DAF effluent is then collected and pumped to e.g. constructed wetlands.

The wetlands can perform further denitrification reactions similar to those that occur in traditional anoxic reactors; however, the benefit is that they also provide a range of additional treatment processes that won't occur in a standard anoxic tank arrangement (e.g. adsorption, sedimentation, nitrification, removal of algae, filtration, and disinfection). The constructed wetlands provide the following treatment:

Removal of any suspended solids carried over from the DAF.

Nitrification should be there in any instances of upset in upstream treatment processes.

Additional denitrification of some remaining nitrate to nitrogen gas.

Adsorption and uptake of some residual heavy metals, phosphate and organics that were not removed in the MBBR and DAF stage.

Disinfection of pathogens that may occur in the leachate.

The designed treatment wetland can be a densely vegetated, shallow system with a 200-300 mm operating depth. There may be minimal open water within the system. The stems, roots and detritus can form a physical framework for bacteria to flourish, in a similar way to what occurs in fixed substrate reactors, but with a much larger surface area than alternative processes can provide. The growth and turn-over of plant biomass can provides an internal supply of organic carbon to feed denitrifying bacteria.

Where leachate is the wastewater, it would be typical for the skilled person to be led to high energy processes for the removal of PFAS alongside other contaminants. The present inventors are focused on the use of low-energy processes and have identified a number of key process modification that align with this paradigm. In the first instance, the inventors identified that active aeration can be used to remove the PFAS from the leachate prior to the removal of other contaminants. This is a change in how leachate is usually treated and represents a cultural shift in response to regulators and waste receivers that are driving the need to treat PFAS in leachate.

The forward-thinking low-energy technology described herein is a multi-staged treatment system centred around harnessing air, gravity and solar inputs to deliver a unique and proven PFAS extraction outcome. The system has been engineered to efficiently and cost effectively extract regulated PFAS contaminants from wastewater using minimal energy and, to the extent possible, no chemicals, consumables or excessive waste transport costs.

In preferred embodiment, the processes does not make use of activities that are energy intensive, including:

Using air for bubble creation rather than chemicals e.g. ozone, high % of nitrogen that require energy input to create (or pose an Environmental or Human Health Risk during use or transport)

No vacuum is applied during any process

No electrochemical treatment, which is energy intensive and produces additional waste stream Reduced number of motors, reduced energy.

Reduced energy input (e.g. heating)

The low energy process has a low overall kW. The kW/L of the treatment is linked purely to the PFAS removal stages, and is not intended to be calculated based on the removal of the first group of contaminants (by DAF, MBBR, SBR etc.). In embodiments, the process has a Low Energy of between 0 to 0.008 kW/L for a system operating at up to 500 L/hr or 0 to 0.004 kW/L for a system operation up to 5000 L/hr. On a kW basis, it is proposed that an 8,640 L/hr system could achieve treatment at 15 kW.

Some prior processes of PFAS removal use vacuum assisted aeration of the waste. A PFAS enriched concentrate is then sent to a hyper concentrator which uses the same vacuum process as in the first aeration stage but acts independently (i.e. can be turned on and off to process foam as required). Following the subsequent aeration process, the waste is sent to a tank where it can be topped up to maintain the level in the reactor and manage foam volume. In these types of processes, because of the vacuum, the subsequent processes they use include a knock-out drum, then vacuum distillation, as well as a drum dryer. The present processes do not require these types of additional processes for treatment.

By above ground it is meant that the process is not undertaken in an in-ground well. The contaminated waste stream can be treated above ground in e.g. a fixed small tower fractionator. The small tower fractionator can have a fixed hood skimmer. There can be no vacuum applied to the fractionator. An advantage of operating above ground, is that the first active aerator can be a different vessel to the second active aerator. This is not possible in-ground, where due to inherent situational constraints multiple cycles of e.g. foam fractionation have to be performed in the same in-ground well. Furthermore, from a leachate or wastewater perspective it would not be advisable to aerate inside a landfill cell in situ due to landfill gas extraction and or creating potentially dangerous atmospheres or loss of containment.

By having the flexibility to provide a second vessel taking waste from the first vessel, above ground, the size and operation of the second vessel can be controlled independently. Optionally, the second vessel can be smaller in size than the first vessel, because the volume of PFAS contaminated waste that it receives is significantly less than the first vessel. This represents a saving in cost, footprint and operation time required for treatment. Optionally, the third vessel can be smaller in size than the first vessel, because the volume of cleaned water stream that it receives is significantly less than the first vessel.

When the wastewater being treated is leachate, there can be a variable nature of the feed PFAS concentration, even within a short time period. This is attributed to different leachate cells feed varying conditions. Instead of using a single stage of active aeration with one retention time, multiple stages in series are used, each having a reduced retention time (the total retention time being approximately the same). This may enable the user to tailor the treatment at each stage producing lower volumes of foam with a typically higher concentration of PFAS. This feeds into the idea of low-energy because the smaller amount of foam is easier to handle and treat, and is a smaller volume of waste resulting in a requirement for less equipment and footprint.

The present disclosure can therefore accommodate for the varying change in PFAS feed concentration by providing for multiple stages of active aeration each with a retention time of at least about 20, 15 or 10 minutes. It has been found that a shorter retention time when undertaken in multiple stages of active aeration is better than having longer retention times in fewer stages of active aeration.

It should be understood that the invention is not limited to foam fractionation and other active aeration processes are within the scope. Where foam fractionation is referred to herein it should be understood that other active aeration processes can equally apply. Other methods of aeration that could be relevant include Jet Aeration or Stripping with a foam removal step. Another type of active aeration is Dissolved Air Flotation (DAF). Induced Aerated DAF could also be used. DAF is a water treatment process that clarifies wastewater by removing suspended solids. The removal is achieved by dissolving air in the water or wastewater under pressure and then releasing the air at atmospheric pressure in a flotation tank.

In an embodiment, however, the first vessel is a foam fractionator. The second vessel can also be a foam fractionator. Thus, in another aspect there is provided an above ground method for generating a highly PFAS concentrated waste stream, comprising:

passing PFAS contaminated waste through a first foam fractionator at a flow rate to provide a retention time of at least 15 minutes to produce a foamate having a first PFAS concentration;

passing the foamate through a second foam fractionator at a flow rate to provide a retention time of at least 15 minutes to produce a second foamate having a second PFAS concentration;

passing the second foamate through a further process to produce a waste stream having a third PFAS concentration;

wherein the third PFAS concentration is higher than the second PFAS concentration.

In an embodiment the "further process" in any one of the aspects described is a further stage (third stage) of active aeration. In this embodiment there are therefore three stages of active aeration. The three stages of active aeration can comprise the first aeration stage in the first vessel which produces a waste stream comprising a concentration of PFAS and a first water stream. The second aeration stage in the second vessel which further concentrates the PFAS in a second waste stream, and also generates a second water stream. And a third aeration stage in a third vessel which actively aerates the second water stream in a third vessel. The vessels can be the same, or the vessel can become sequentially smaller in volume. There can be more stages of active aeration in sequence if required, but it is preferable to reduce the number of stages so as to increase performance efficiency. In an embodiment, there is a fourth stage of active aeration. The fourth stage may be necessary for example if it is desirable to take PFAS (e.g. PFOA) to a non detectable level in the liquid stream. It may be necessary to go through multiple passes of the foam in fractionator four in order to achieve the desired PFAS removal.

In an embodiment, the first process and or the second process and or the third active aeration process and or the fourth active aeration process (and any other stages of active aeration) are optimised by selecting, controlling and or adjusting the gas flowrate of e.g. the foaming process; the aeration residence time during e.g. the foaming process; bubble size; extraction device, liquid pool depth; liquid residence time. The skilled person familiar with active aeration will readily understand how to modify the active aeration processes to achieve the results based on their own knowledge and combined with the teachings herein.

Optionally, a co-surfactant or steric stabiliser can be added to the contaminated water during aeration. Preferably, a non-toxic and biodegradable chemical, this will help stabilise the air bubbles, allowing more surface area for the PFAS to adsorb onto in the timeframe of bubble rising to the surface. This allows for higher concentrations of PFAs in the foamate.

In some embodiments, the air pressure and or the bubble size provided to the second, third and or fourth vessel is different to that applied to the first vessel. Furthermore, in some embodiments, the air pressure and or the bubble size provided to e.g. the third vessel is different to that applied to the first and or second vessel.

In embodiments, each foam fractionator can comprise sized diffusers producing fine microbubbles needed for the operation. The main principle behind using fine bubble diffusers versus coarse bubble diffusers is that smaller bubbles result in a much higher bubble surface area per unit volume and therefore are thought to provide more contact with the leachate PFAS. Fine bubble sizes range from 0 to 3 mm. Bubbles with a diameter of 3 mm are considered to be a large maximum size which to the extent possible, the process attempts to avoid. Course bubble diffusers, venturi and air blocks will have a bubble size of 3 mm to 50 mm. Accordingly the bubbles used in preferred embodiments of the present invention are fine bubbles having an average diameter less than about 3, 2, 1 or 0.5 mm. A typical disk diffuser can produce bubbles in the range of from about 0.8 to 2.1 mm.

Fine Bubble Advantages

Higher surface area, more contact with leachate/PFAS (compared to all course bubble options)

Require less energy to run (compared to coarse bubble diffusers)

Lower volatile organic compound emissions (compared to coarse diffusers or mechanical aeration devices)

Fine Bubble Disadvantages

Susceptible to chemical or biological fouling—leading to impaired oxygen transfer/aeration inefficiency)*

More expensive—fine pore diffusers require more routine cleaning and replacement (plus additional costs of maintenance and downtime)

Energy cost challenges—when fine pores become clogged, the diffusers may require more energy to operate (than coarse diffusers)

Air Flow distribution is critical for fine diffuser performance. This requires proper selection of Air Flow Control Systems to ensure fine pore diffusers function at peak efficiency levels.

It is worth noting that the flexibility of bubble production is not optimal in in-ground water treatment. The in-ground contained wastewater has specific sized air bubbles injected at an adjustable pressure.

The extent to which upstream processes remove PFAS and other contaminants from the first group, e.g. suspended solids will greatly influence the further treatment options in the further process, and possibly other downstream biological processes. Therefore, optimum design parameters for the full-scale system in the first and second (and third) processes are desirable.

The other design parameters that need to be determined in the optimization tests include the hydraulic retention time (HRT), superficial gas velocity, the configuration of the vessel e.g. type of fractionator (i.e. column) and the height of the riser (which sets the water depth in the vessel) and the ratio of contaminated water treated per second to volume capacity of vessel. Other details that can be optimised include the bubble size as described above, pressure at the diffuser head, diffuser area coverage and blower specifications.

As part of the optimisation the following can be selected, controlled and or adjusted:

Gas flowrate (superficial velocity)—a lower gas flowrate is expected to give greater enrichment but reduced recovery and a drier foam. In an embodiment the gas flowrate during active aeration is in the range of from about 0.0005 to 0.010 m/s, preferably 0.005 to 0.008 m/s.

Gas residence time—need enough detention time to extract the maximum amount of PFAS from the bubbly liquid. In an embodiment, the gas residence time is in the range of from about 5 to 15 minutes, more preferably 7 to 12 minutes. In an embodiment, the gas residence time is in the range of from about 7.41 to 11.45 minutes. The time can vary depending on the foam volume, where longer time may be required to achieve the desired amount of foam.

Bubble size—as described above, smaller bubbles will provide more surface area for adsorption but they do not dewater as easily and as the raw wastewater foams so strongly very small bubbles may be avoided. On the other hand, production of larger bubbles requires less energy and dewater better, but PFAS capture may not be as good.

Liquid Pool Depth—Foam column height will be investigated by adjusting the liquid level in the column.

It is useful to know the minimum/maximum depth of the liquid pool to achieve the optimum waste stream production rate. Liquid retention time within the vessel is an important factor at this time. The vessels are sized to have a certain retention time at a certain flow rate. Reducing the liquid level would reduce retention time at this point and have a detrimental effect on PFAS removal, so should be avoided. Changing liquid depth will have an effect on gas retention time within the liquid, as it passes through the liquid quicker if there is less height of liquid to pass through (but backflow recirculation can also be used to increase gas retention time).

Foam column height—investigate the minimum foam height to achieve a reasonable dewatering of foam. The water level in the vessel can be managed through the use of a standpipe, which will have multiple levels that an operator could choose to adjust manually based on the foam conditions.

Wastewater residence time in column—HRT. In an embodiment, the wastewater must be resident in the column at least for 4, 5, 6, 7, 8, 9, 10, 11, 12, 13, 14 or 15 minutes. In an embodiment the liquid is retained in each vessel for an active aeration stage lasting at most 15 minutes. In an embodiment, the liquid is retained in each vessel for an active aeration stage lasting at least 15 minutes. Where there are two stages of active aeration the total residence time is therefore 30 minutes. Where there are three stages of active aeration the total residence time is 45 minutes. Where there are four stages of active aeration the total residence time is 60 minutes.

In embodiments, even after optimisation of the first and second processes, the foamate waste stream with the second and third PFAS concentration will likely benefit in further volume reduction to minimise the cost of destruction and/or disposal. Volume reduction is particularly desirable when the foamate has to be stored or ultimately transported off-site for disposal or incineration. Volume reduction is by passing the foamate (that has a concentration of PFAS) through a further process, to produce a more concentrated waste stream that has a PFAS concentration that is higher than the previous concentrations. The process can include additional (e.g. four or possibly more) processes to further concentrate the PFAS in the stream.

In embodiments, the main aim for the multiple treatments of the foamate will be to reduce the volume of PFAS waste for disposal by about 75, 80, 85, 90, 95, 98, 99, or 99.998%, whilst also containing the PFAS waste. In some embodiments, the final waste is from 0.002% to <1% by volume of the raw waste stream.

In an embodiment, the optimization of the first process in a first fractionator can focus on reducing the foamate volume to less than about 10%. In some embodiments, the foamate volume is reduced to at most about 2, 3, 4, or 5 vol % of the contaminated wastewater.

In an embodiment, PFAS contaminated waste is fed to the first fractionator (100%) to produce a water stream (90 or 95%) and foamate (5 or 10%). The foamate from the first fractionator is fed to the second foam fractionator. The second foam fractionator can be the same as the first foam fractionator. The second foam fractionator can be the same size as the first fractionator. Alternatively, the second foam fractionator can be smaller than the first fractionator. The second foam fractionator can be about 3 to 6% the size of the first fractionator since the second fractionator is receiving a much smaller input. In an embodiment there is provided an above ground foam fractionation process in which there are two or three above ground foam fractionators operated sequentially in which the second and or third foam fractionator is smaller than the first foam fractionator in the sequence.

The present process may result in at least about a 10 to 200 fold reduction in contaminated waste volume.

There are multiple processes in the method. The processes are sequential and not concurrent meaning that each process that occurs after an earlier process is reliant on the outcome of the earlier process for feed. In embodiments there are five processes in the method for the removal of PFAS. These five processes can comprise three stages of active aeration, one stage of drying in e.g. a solar distiller and one stage of further drying in e.g. a pan evaporator. There are then other processes (run separately) as described herein for the removal of the first contaminants from the water.

The processes can be operated continuously. The smaller size of the second vessel can be achieved if the method is run continuously.

In embodiments, viable options to further concentrate or treat the foamate from the foam fractionation process include: (1) second and optionally third stage separation of the foamate as described above, then (2) drying—evaporation or thermal processes, (3) activated carbon, (4) Ion exchange, (5) Nano-filtration and/or reverse osmosis, and (6) reed bed.

(2) Drying—Evaporation or Thermal Processes

Drying of the foamate using pan evaporation and solar concentration offers a potentially simple option to dry the foam, but also introduces issues associated with open ponds and their inundation during rainfall events. To enhance the evaporation of the foamate, solar drying can be accomplished in covered drying beds or greenhouses. The solar drying system (greenhouse) can comprise of a rectangular base structure and translucent chambers, circulation fans, ventilation fans, and optionally (if needed) a mobile electromechanical device that turns the solids periodically. The primary advantage of the solar drying system is that solar radiation is the main source of drying energy, and the footprint is likely much smaller than an open pond.

In some embodiments a first drying method could be used to concentrate larger volumes of foamate, and then a small solar drying bed (if needed) can be used for reduction to salt only, for removal and destruction.

Foamate volume reduction may also be accomplished using thermal drying. Thermal drying involves the application of heat to evaporate water and reduce the moisture content of the foamate. Thermal drying is a process that has a small footprint, however it has relatively high capital cost and due to its complexity requires highly trained operating staff (3) Activated Carbon Depending on the foamate properties, it may be possible to use Granular Activated Carbon (GAC) on the foamate. The process can be evaluated by undertaking isotherm testing, to assess GAC capacity with the foamate. The use of GAC will generate spent GAC requiring disposal, but offers a pathway to remove PFAS from foamate noting the large volume reduction that is passing through.

The foamate potentially could be pumped through a GAC column to adsorb contaminants. Adsorption is both the physical and chemical process of accumulating a substance at the interface between liquid and solids phases. Activated carbon is an effective adsorbent because it is a highly porous material and provides a large surface area to which contaminants may adsorb. The two main types of activated carbon used in water treatment applications are granular activated carbon (GAC) and powdered activated carbon (PAC). PFAS and other compounds will be adsorbed into the GAC. The GAC is usually disposed of once expended.

(4) Ion Exchange

Anion exchange has also been used for the removal of PFAS's from groundwater, but is not appropriate in raw leachate due to the high ion concentrations. However, depending on the foamate characteristics, it may be a practical option.

Ion exchange is an exchange of ions between two electrolytes or between an electrolyte solution and a complex. In most cases the term is used to denote the processes of purification, separation, and decontamination of aqueous and other ion-containing solutions with solid polymeric or mineralic. Ion exchange is as the name suggest the exchange of one ion for another. Remove one ion of contaminant and release an ion of that we can tolerate or deal with at a later stage. It may be possible to use this technology to further reduce the PFAS volume. The Ion Exchange resin requires regeneration when expended. This will require additional chemicals (Acids/Bases) which will require disposal.

(5) Nano-Filtration and/or Reverse Osmosis

Nano-filtration and/or reverse osmosis have been demonstrated as methods of separating PFAS's from groundwater. Whilst this is practical in a small volume and low TDS water, it is not suited to the raw leachate.

Nano filtration or RO provides a membrane which the PFAS components cannot pass through. This technology can be used to reduce the foamate volume prior to solar distillation and evaporation.

(6) Reed Bed

Reed bed (RB) vertical or horizontal systems are designed to passively reduce volume by maximising evapotranspiration and filtration of some contaminants. The process involves utilising gravity, sunlight and transpiration to reduce the waste stream volume. It is thought that reed bed concentration will work very well if the soil filters and plants take up the PFAS, and no PFAS drains out of the reed beds in the filtrate. However, all the biosolids produced would be PFAS contaminated and need destruction.

The choice of which further processing to use, will depend on the nature of the contaminated waste being handled. To use activated carbon or ion exchange, which are absorption processes, the wastewater needs to be very clean already, or (carbon especially) just absorbs everything. Nano filtration and RO also need relatively clean or brackish water, or they are just constantly back washing (NF) CIP washing (RO). For leachate, evaporation or distillation are the best options as the liquid is still so filthy. Also for consideration is the available m2 on site for plant footprint; available evapotranspiration rate; willingness for landfill to receive spent GAC/IEX; and requirements from regulator for storage/transport/disposal of PFAS impacted waste.

Following the further process of which there can be more than one additional processes. The additional processes are to further reduce the volume of the foamate sludge. The additional processes comprise e.g. further drying steps such as drying in a pan evaporator to further concentrate the PFAS in the waste. There is a cost associated with destroying PFAS contaminated waste, and this cost can be based on volume and or weight. An aim of the present process is to reduce the volume and or weight of the PFAS contaminated waste to be as small as possible to reduce the destruction costs.

BRIEF DESCRIPTION OF THE FIGURES

Embodiments of the invention and other embodiments will now be described with reference to the accompanying drawings which are not drawn to scale and which are exemplary only and in which:

FIG. 4 are tables showing PFAS feed concentration and the deviation in these results experienced on site.

FIG. 5 is a table showing the outcome data from experimental trials.

DETAILED DESCRIPTION OF EMBODIMENTS

Foam Fractionation is a chemical engineering process in which hydrophobic molecules are preferentially separated from a liquid solution using rising columns of foam. It is commonly used, albeit on a small scale, for the removal of organic waste from aquariums; these units are known as "protein skimmers".

The fundamental principle behind the novel technology described herein is a variation of the process of foam fractionation. Surprisingly foam fractionation can also be used for the removal of surface active contaminants from waste water streams. PFAS molecules are usually quite surface active, meaning that they are inherently attracted to air/water interfaces. This new water treatment technology takes advantage of this property of PFAS molecules.

A key element is the introduction of gas (typically air) bubbles well below the water level of a sample of PFAS contaminated water using a specific bubble diffuser system. As the bubbles mix with the water and rise to the surface, the surfaces of the bubbles are energetically stabilised by the surface active PFAS molecules, which diffuse from the bulk of the water to the bubbles and then adsorb onto the surfaces of the bubbles. This process prevents the bubbles from coalescing. When the bubbles reach the surface of the water sample, foam is formed at the surface. This foam, which is highly concentrated in PFAS, can then be removed from the surface, dewatered and transported to a treatment plant for safe disposal or destruction. By these means a PFAS can be removed from a contaminated water sample.

Figure 1:
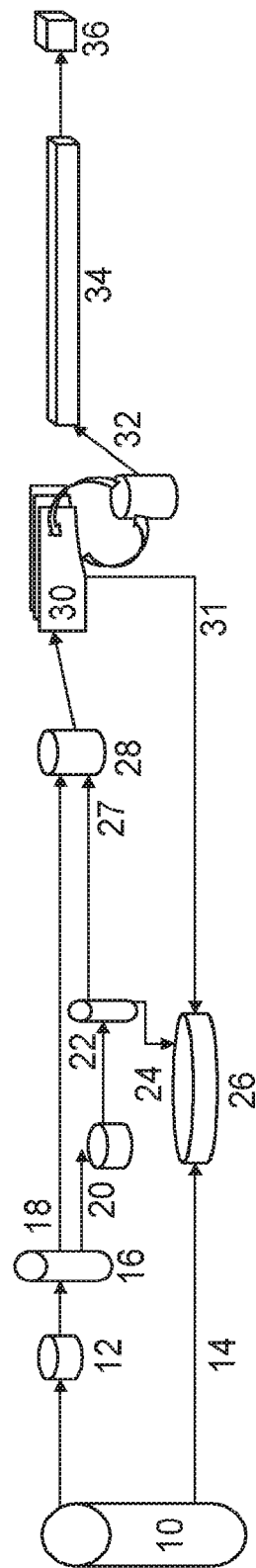
FIG. 1 is a process flow diagram showing an embodiment of a process.

In FIG. 1 there is shown an above ground method of dewatering contaminated waste comprising PFAS. It also shows an above ground method for generating a highly PFAS concentrated waste stream.

Explanatory Notes for FIG. 1

Stage 1 concentrate is foamate (With PFAS)

Stage 2 concentrate is foamate with concentrated PFAS

Stage 3 Concentrate is foamate from the treated side of Stage two
A Aerator/Separator treating raw wastewater (bulk of material sent to clean storage tank)
B Storage and settling of foam
C Aerator/Separator treating Foam from stage 1
D clean (Stage 2 concentrate) storage/settling
E Aerator/Seperator3 treating Tier 2 concentrate. Tier 1 (foamate) sent to settling tank
F All fractioned waste stored here
G Solar drying
H Concrete pad or plastic drying bed. Could have wet weather covers
I Dry waste scraped from the drying bed periodically and stored and destroyed In a first vessel 10, the contaminated waste comprising PFAS is actively aerated. In an embodiment the first vessel is a foam fractionator 10 and the active aeration is the formation of bubbles in the fractionator. The PFAS contaminated waste is passed through the first foam fractionator 10 from an input (not shown) and out via an output (not shown). The process produces a first waste stream 12 comprising a concentration of PFAS and a first water stream 14. The first waste stream 12 can comprise a foamate having a first PFAS concentration. In an embodiment, the bulk (about 90 to 95%) of the treated wastewater from the fractionator 10 is the first cleaned water stream 14 that is sent to a clean water storage tank 26. While this is referred to as "clean" water it should be understood that it is cleaned of PFAS and there may be other contaminants remaining to be removed. First waste stream 12 comprises about 4 or 5% of the separated stream. The first waste stream 12 is subject to a second process comprising actively aerating the waste stream in a second vessel 16. In an embodiment the second vessel 16 is also a foam fractionator 16 and PFAS contaminated waste (which can be foamate) is passed through the second foam fractionator 16. This produces a second waste stream 18, 20 having a second PFAS concentration. Also produced is a second cleaned water stream 21. In an embodiment, the cleaned water stream (not shown) is about 95% of the total water input to the fractionator 16. The second waste stream 18, 20 can be treated, as shown in FIG. 1 by arrow 20, by passing it to third vessel 22. The third vessel 22 can be a third foam fractionator 22. There can be third waste stream 27 generated from the third foam fractionator 22. The third cleaned water stream 24 from third foam fractionator 22 can be passed to storage tank 26. Alternatively, the second waste stream shown at arrow 18 can by-pass this third treatment step and instead be collected at vessel 28. In this embodiment, the third waste stream 27 from the third foam fractionator 22 can be combined with the second waste stream 18 from the second foam fractionator 16. The two waste streams 18, 27 can be collected at vessel 28 before being subject to further processing. In FIG. 1, the further processing is solar drying 30, to further concentrate the PFAS (a third PFAS concentration) in the waste stream 32, and to generate a solar cleaned water stream 31. In an embodiment, the waste stream from vessel 28 is circulated through the solar drying 30 multiple times until salt concentration is maximised without compromising flow. The number of recirculation passes within vessel 30 depends on solar radiation rates specific to the location, flow volume relative to scale of solar drying 30 and contaminant levels in waste stream from vessel 28. The first 14, second 21, third, 24 and solar cleaned water streams 31 are collected into vessel 26. This treated PFAS free water can be discharged or subject to further treatment. The treated wastewater 32 from the solar drying 30 can be passed on to a further drying bed 34. The cost effectiveness of this process depends critically on the volume of the contaminated waste stream 36 that has to be shipped to a treatment plant for safe disposal or destruction. In an embodiment, starting with 100,000 litres of wastewater for treatment, the result can be as low as 65 kg of dewatered contaminated solid.

Figure 6:
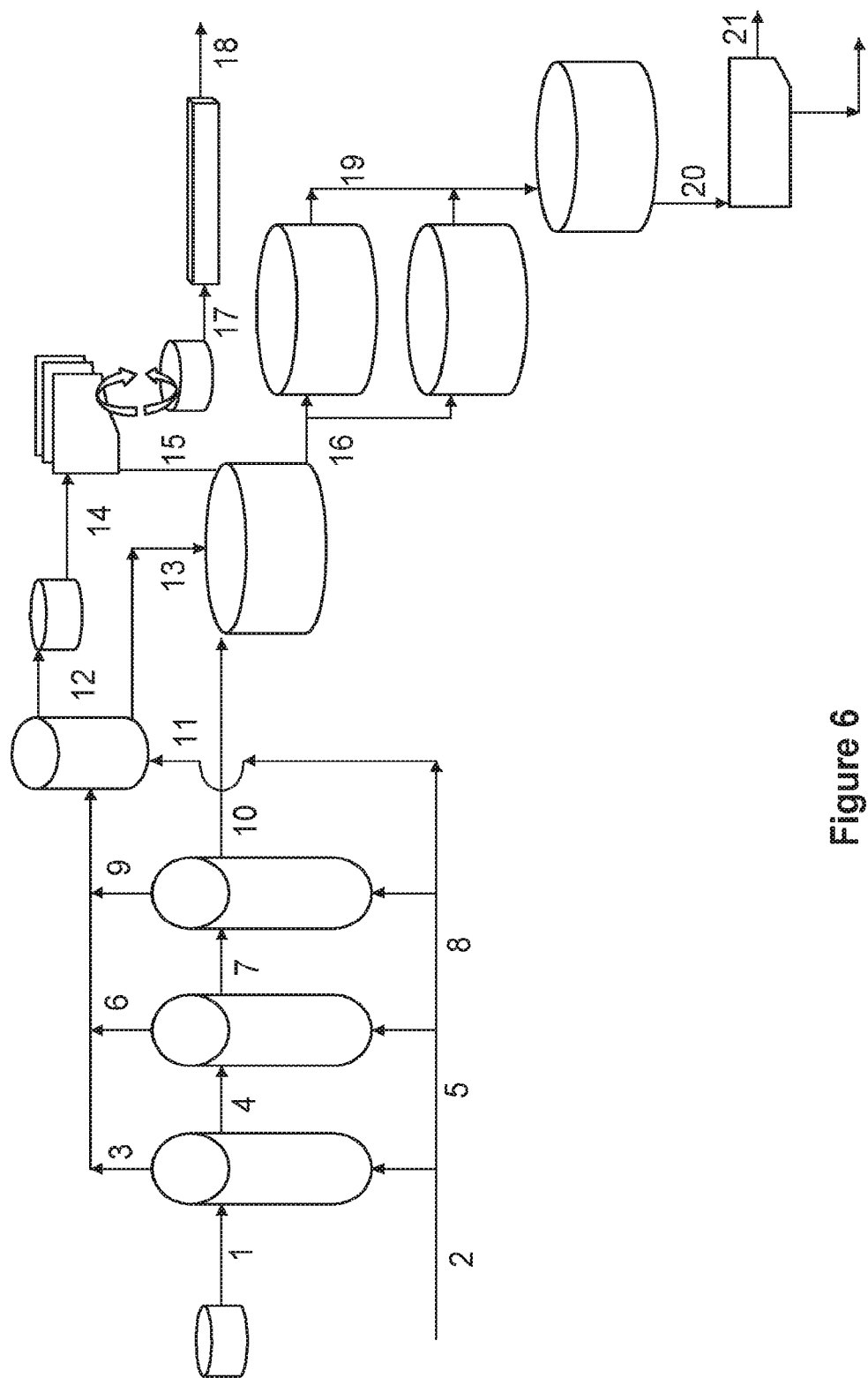
FIG. 6 is a process flow diagram showing an embodiment of a process.

In FIG. 6 there is shown an above ground method of dewatering contaminated waste comprising PFAS and other co-contaminants (first group of contaminants). It also shows an above ground method for generating a highly PFAS concentrated waste stream.

Step (i). A liquid waste stream is pumped to first aerated separator 110 at a rate that enables a minimum retention time of 15 mins in the separator.

Step (ii). Air is introduced through the bottom of the first aerated separator 110 at a rate that provides the desired foam, velocity, residence time.

Step (iii). Foam is extracted from the first aerated separator 110 at a rate to enable minimum retention time of 15 mins in the separator.

Step (iv). Liquid stream flows under influence of gravity to second aerated separator 116 at a rate that enables a minimum retention time of 15 mins in the separator.

Step (v). Air is introduced through the bottom of second aerated separator 116 at a rate that provides the desired foam, velocity, residence time.

Step (vi). Foam is extracted from second aerated separator 116 at a rate that enables a minimum retention time of 15 mins in the separator.

Step (vii). Liquid stream flows under influence of gravity to third aerated separator 122 at a rate that enables a minimum retention time of 15 mins.

Step (viii). Air is introduced through the bottom of third aerated separator 122 at a rate that provides the desired foam, velocity, residence time.

Step (ix). Foam is extracted from third aerated separator 122 at a rate that enables minimum retention time of 15 mins in the separator.

Step (x). PFAS treated liquid stream flows to holding tank for additional processing.

Step (xi). Air is introduced through bottom of fourth aerated separator 140 at a rate that provides the desired foam, velocity, residence time.

Step (xii). Foam extracted from fourth aerated separator 140 and flows to concentrate tank.

Step (xiii). Treated liquid stream from fourth aerated separator 140 moves to holding tank for additional processing of co-contaminants.

Step (xiv). PFAS Concentrated foam is recirculated around the enclosed solar distillation unit.

Step (xv). Distillate from solar separation returns to treated liquid.

Step (xvi). Treated liquid from holding tank to SBR.

Step (xvii). Concentrate stream from enclosed solar distillation sent to covered drying bed.

Step (xviii). Regulated Waste Disposal of solid.

Step (xix). Treated liquid 142 transferred from holding tank to MBBR.

Step (xx). Treated liquid from MBBR sent to DAF for issue to Wetland and discharge/reuse at step xxi.

In summary, FIG. 6 shows an above ground low energy method of dewatering waste contaminated with at least a first group of contaminants and PFAS, the method comprising the steps of:

(a) removing the PFAS before removing the first group of contaminants (steps (i) to (xv));

(b) removing the first group of contaminants (steps (xvi) to (xx)).

In step (a) the removal of PFAS is undertaken by actively aerating the contaminated waste comprising PFAS in a first vessel (110) to produce a waste stream (112) comprising a concentration of PFAS and a first liquid stream (114) having at least some of the first group of contaminants. The liquid stream 114 is then subject to a second process comprising actively aerating the waste stream in a second vessel (116), and also to generate a second liquid stream (121) having at least some of the first group of contaminants. The second liquid stream 121 is then subject to a further process comprising actively aerating the waste stream in a third (122) vessel to further concentrate the PFAS in a third waste stream (127) and also to generate a third liquid stream (124) having at least some of the first group of contaminants. The waste streams are subject to a fourth process comprising actively aerating the waste stream in a vessel (140) to further concentrate the PFAS in a fourth waste stream (141), and also to generate a fourth liquid stream (142) having at least some of the first group of contaminants. The liquid streams can be combined prior to treatment in step (b). The waste can also be subject to solar distillation. In step (b), the removal of at least some of the first group of contaminants can be undertaken. This can be undertaken by a different processing entity is desired. In which case, the liquid in the batching tank would be transferred to the location for further treatment. Alternatively, the further treatment is undertaken by the same entity on site.

Figure 2:
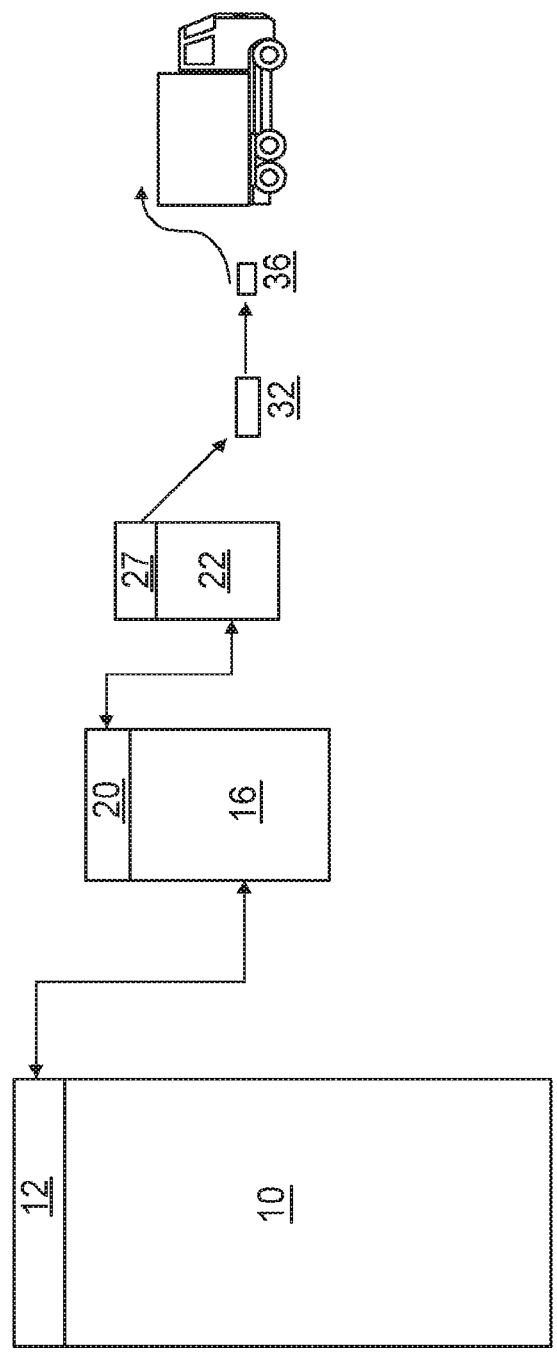
FIG. 2 is a schematic showing the progressive reduction in waste volume.

FIG. 2 is a schematic showing the progressive volume reduction of the waste through the low energy process. In the first vessel, the first foamate is of a large volume. However, following treatment in the second vessel 16, the volume of the second foamate 17 is reduced. Following treatment in the third vessel 22 the volume of the third foamate 25 is further reduced. The further process 30 can further reduce the volume of foamate. An additional process can further reduce the volume of foamate waste. The result is an amount of PFAS contaminated waste that is small and relatively easy and cost effective to carry by transport (e.g. truck) and destroy.

Approaches to the destruction of PFAS include high temperature incineration, plasma arc pyrolysis, thermal desorption, and cement kiln combustion. An alternative to destruction is disposal of concentrated PFAS liquid or sludge in non-biodegradable packaging at landfill. In most cases there is an economic imperative to reduce the volume of the treated waste stream containing PFAS since (a) transport of this waste stream can be expensive and proportional to the total volume of waste to be transported, and or (b) treatment costs are typically proportional to the total volume of waste to be treated.

The primary treatment technology includes:
(1) A means for injecting air bubbles into a sample of contaminated water in the fractionators 16 and or 22. This requires an air pump and pipe, with a specially modified element at the exit that create air bubbles of a specific size and size distribution. Typically, this element is an air diffuser—a fine pore membrane or filter element, typically with pores>25 microns and up to 100 microns, made from ceramic, polymeric of metallic materials.
(2) After the bubbles so formed have risen through the water, attracting PFAS molecules, and formed foam at the surface, there is a means to remove and capture the foam. This can be via an air blower, a vacuum suction system, a physical scraping arm, gravity or other means. The foam can be captured in a separate tank.
(3) Following this process optionally there can be a means to "break" the foam in order to reduce the volume and form the so-called "foamate". Foam breaking can happen naturally by storage and settling, or it can be achieved by chemical or mechanical means. Chemical defoaming methods involve the use of an antifoam agent, typically silica based, which work by reducing the stability of the thin liquid films (lamellae) within the foam structure. Mechanical foam breakers, including turbine, vaned disk and paddle blades, destroy foam by inducing rapid pressure change and applying shear and compressive forces to the foam leading to bubble rupture. Ultrasound can be used as a mechanical foam breaking method.
(4) Further reduction of foamate volume can be achieved by drying of the foamate to remove water. Drying can be achieved by solar evaporation or by one of many means of thermal evaporation with added energy (e.g. IR drying, convective drying, and others).
(5) When passing to a next foam fractionate stage, the feed can be (optionally) mixed with a small volume of water in the next treatment step, and the treatment steps 1-4 described above can be repeated on this stream input, thus forming a further foamate. In some instances, the further foamate has a much higher concentration of PFAS, with all the attendant economic benefits of doing so.

The method incorporates these elements:
1. Introducing air bubbles into a PFAS contaminated water sample.
2. Collecting the PFAS concentrated foam from the surface of the contaminated water sample.
3. Optionally dewatering the foam to create a foamate.
4. Optionally transporting the foamate for destruction or disposal.
5. Preferentially, the foamate is treated in further processes.

Figure 3:
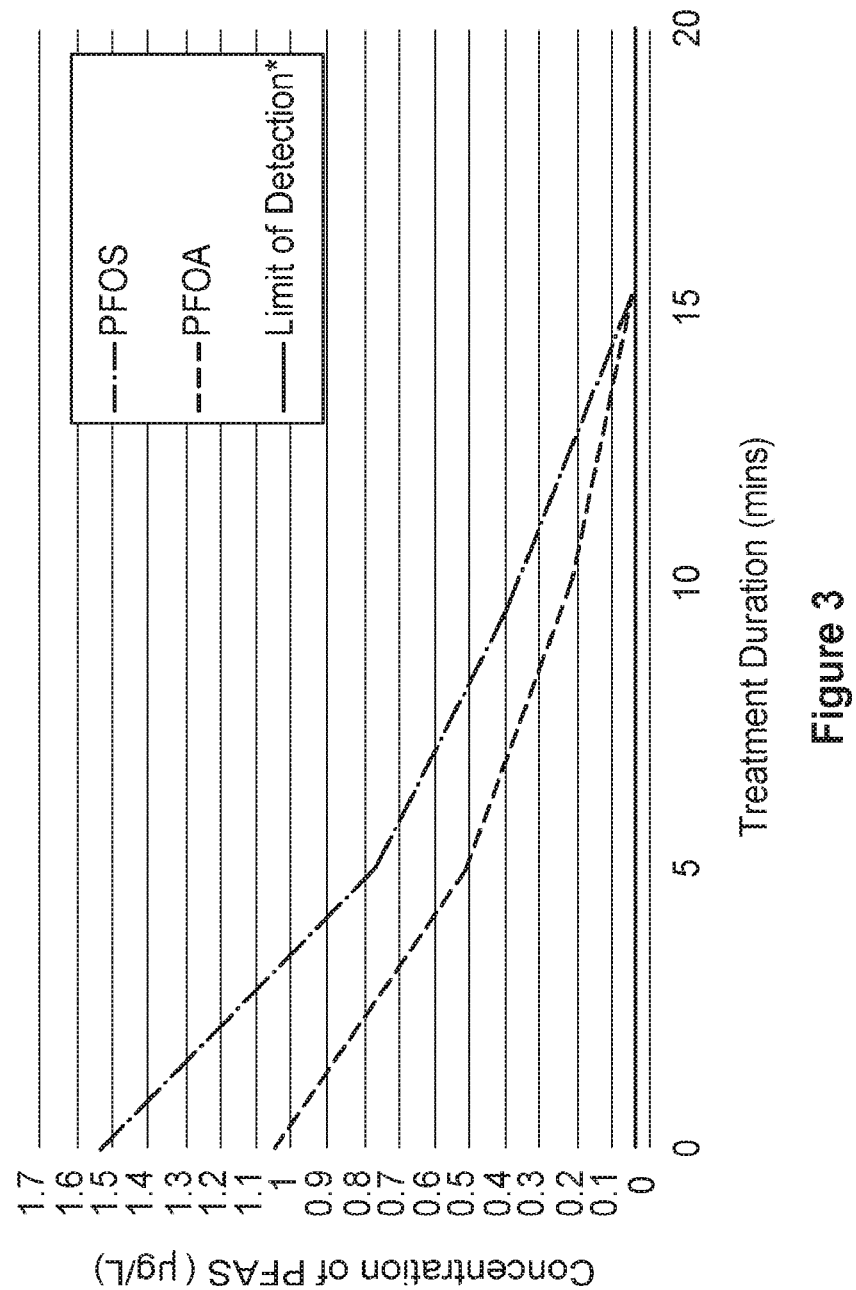
FIG. 3 is a graph showing PFAS concentration reduction over time.

FIG. 3 is a graph showing the PFAS concentration reduction over time.

The apparatus has a number of key elements. First is the choice of an above ground treatment, which differs from an in-situ treatment. In the in-situ treatment, PFAS contaminated water is contained in a bore or a well or a leachate pond, a clarifier, or tailings dam, or similar. The air pipe is introduced into the bottom of this water containment vessel, and the foam fractionation process takes place in-situ. The foam is removed, preferably with a suction pipe for further treatment. Typically, if a whole dam or pond of contaminated water is being treated by these means, a method for stirring the water or creating circulation is required to ensure that the all the pollutants in the water have residence time near the source of air bubbles. After a period of time from commencement of treatment, the overall concentration of PFAS in a pond, well or dam will have been reduced below a required level and the process can be halted. In essence this can be considered as a batch process.

An alternative to in-situ treatment is provided herein. The above ground treatment is undertaken in a specially constructed foam fractionation vessel, typically a tank that is brought to site, which is designed especially for the purpose of foam fractionation. Such a tank includes air diffusers and foam collection technology. Input water from a contaminated source can be continuously injected into the tank whilst an equivalent amount of treated water is extracted; the overall level of water in the tank remains constant as does the concentration of PFAS in steady state. The benefit of such a tank based system is that the foam fractionation can be operated at the most efficient rate meaning that, for the treatment of a fixed volume of contaminated water, less time is required at site compared to the in-situ treatment option. A second and optionally third and fourth specially constructed foam fractionation vessel can be used for the purposes of concentrating the foamate in a secondary waste stream process, and so on; the subsequent foam fractionation vessel can have a smaller volume than the first one.

Experimental Data

The following experiments are exemplary only and are intended to illustrate embodiments of the invention.

A total of 31 samples of leachate were collected from a wastewater in the form of leachate. Of the 31 samples collected, a significant deviation in feed concentration was identified. Surprisingly, this deviation was significantly larger than that reflected in the bench scale trials or identified in the routine sampling that had previously been undertaken at the site and would require additional steps and testing to enable continuous treatment performance without introducing significant amounts of heat or energy requirements. On one day of operation the inlet concentration of PFOS to the plant ranged from 0.8 ug/L to 2.7 ug/L. A variation of 1.37 ug/L which is equivalent to 10× the 95% guideline limit specified in the NEMP. Variations were also noted in PFOA with concentration ranging from 0.45 ug/L to 7.30 ug/L. Sum PFAS concentrations were in the range of 13 ug/L to 26.9 ug/L (Tables in FIG. 4).

Subsequently additional testing has been undertaken on foam treatment, liquid concentrations and the ability to treat PFAS in the presence of co-contaminants, most notably ammonia and TOC.

PFAS in the raw stream has already been discussed above. Concentration in the first pass foam (treated with one stage of active aeration) has been found to be in the range of 0.77 ug/L to 90.80 ug/L PFOS, 3.38 ug/L to 135 ug/L PFOA and 20.2 ug/L to 397 ug/L sum PFAS. Additional concentrations steps of foam produced more consistent yields in concentration with PFOS concentrations of 72.1 ug/L to 342 ug/L PFOS. 60.2 ug/L to 156 ug/L of PFOA and 232 ug/L to 848 ug/L of sum PFAS. Indicating a concentration step of PFOS, PFOA and other PFAS of 98%, 98% and 97% between maximums, respectively.

In solar drying applications TDS has been observed to increase from 9,510 mg/L to 182,000 mg/L with a concentration of sum PFAS in the same batch of the order of 91%.

Co-contaminant concentrations have been found to be within the same order of magnitude as those typically seen at the inlet most notably TOC concentrations and ammonia concentrations in Foamate. This observation has been noted at trials undertaken on liquids from 3 separate leachate sites:
  Site 1: Inlet concentration 402 mg/L TOC, 387 mg/L following active aeration. PFOS 7.5 ug/L, PFOA 2.81 ug/L. Following active aeration PFOS<0.10 ug/L, PFOA 0.22 ug/L.
  Site 2: Inlet range ammonia 544 mg/L outlet ammonia 540 mg/L ammonia through first pass configuration with starting PFOS concentration of 0.178 ug/L and outlet concentration of <0.002 ug/L and PFOA of 0.433 ug/L and outlet concentration of 0.003 ug/L.
  Site 3: Inlet median of TOC of 1220 mg/L, foamate concentration on testing of 1100 mg/L following active aeration. PFOS of 0.34 ug/L at the inlet and <0.1 ug/L following treatment and PFOA of starting concentration of 1.17 ug/L at the inlet and <0.010 ug/L following treatment.

Surprisingly, in liquid sourced from one landfill, a reduction of nearly 50% Total Kjeldahl Nitrogen was identified in the feed liquid concentrated to the foam in conjunction with PFAS removal. From 950 mg/L to 410 mg/L, 457 mg/L and 453 mg/L across three separate tests.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Any promises made in the present description should be understood to relate to some embodiments of the invention, and are not intended to be promises made about the invention as a whole. Where there are promises that are deemed to apply to all embodiments of the invention, the applicant/patentee reserves the right to later delete them from the description and does not rely on these promises for the acceptance or subsequent grant of a patent in any country.

The invention claimed is:

1. A continuous sequential active aeration process for removing PFAS from a contaminated liquid, the process comprising the steps of:
   actively aerating the contaminated liquid in a first vessel using a first applied air rate through a diffuser to produce a first liquid stream;
   discharging the first liquid stream from the first vessel into a second vessel in fluid communication with the first vessel,
   subjecting the first liquid stream to a second process comprising actively aerating the first liquid stream in the second vessel using a second applied air rate through a diffuser to produce a second liquid stream;
   subjecting the second liquid stream to a further process thereby generating a third liquid stream;
   wherein the first applied air rate is independently controllable relative to the second applied air rate.

2. The method of claim 1, wherein the contaminated liquid comprises a first group of contaminants alongside the PFAS, wherein the first group of contaminants are removed after the PFAS removal.

3. The method of claim 1, wherein the further process comprises a third stage of active aeration comprising actively aerating the second liquid stream in a third vessel using a third applied air rate through a diffuser to produce the third liquid stream, wherein the third applied air pressure is independently controllable.

4. The method of claim 3, wherein each stage of active aeration generates a foam, and the foam(s) is/are sent to a fourth vessel for treatment.

5. The method of claim 4, wherein output from the fourth vessel is subject to a solar evaporation drying process to further concentrate the PFAS.

6. The method of claim 2, wherein the first group of contaminants comprises materials that contribute to TOC, materials that contribute to TDS, oil(s), heavy metal(s) or materials that contribute to TN including ammonia.

7. The method of claim 1, wherein the contaminated liquid has a TOC level greater than about 5 mg/L.

8. The method of claim 1, wherein the waste is selected from one or more of sewerage, leachate, contaminated surface water, municipal wastewater and industrial wastewater.

9. The method of claim 1, wherein the PFAS includes perfluorooctanoic acid (PFOA) and perfluorooctanesulfonic acid (conjugate base perfluorooctanesulfonate) (PFOS).

10. The method of claim 1, wherein the active aeration is foam fractionation.

11. The method of claim 1, wherein each vessel is an aerated separator and the applied air is introduced through the bottom of the respective aerated separator.

* * * * *